(12) United States Patent
Douglass et al.

(10) Patent No.: US 6,648,569 B2
(45) Date of Patent: Nov. 18, 2003

(54) VEHICLE CARGO BED WITH MOVABLE PLATFORM

(76) Inventors: James Douglass, 9456 E. Adobe Dr., Scottsdale, AZ (US) 85255; Joseph Burtoni, 4006 E. via Montoya, Phoenix, AZ (US) 85050

( * ) Notice: Subject to any disclaimer, the term of this patent is extended or adjusted under 35 U.S.C. 154(b) by 0 days.

(21) Appl. No.: 10/000,152

(22) Filed: Oct. 31, 2001

(65) Prior Publication Data

US 2003/0170090 A1 Sep. 11, 2003

(51) Int. Cl.⁷ .............................................. B61D 3/16
(52) U.S. Cl. ......................................................... 410/46
(58) Field of Search .................... 410/46, 94, 95, 410/90, 91, 121, 153; 296/26.09, 39.2; 414/522; 248/351; 224/403, 404, 42.33

(56) References Cited

U.S. PATENT DOCUMENTS

| | | | |
|---|---|---|---|
| 2,852,303 A | | 9/1958 | Hopson |
| 3,006,487 A | | 10/1961 | Gelli |
| 3,726,422 A | | 4/1973 | Zelin |
| 4,027,892 A | * | 6/1977 | Parks ............................ 410/3 |
| 4,222,695 A | | 9/1980 | Sardes .......................... 410/68 |
| 4,358,035 A | | 11/1982 | Heidecker |
| 4,909,384 A | | 3/1990 | About |
| 4,941,784 A | * | 7/1990 | Flament ...................... 410/121 |
| 4,955,771 A | * | 9/1990 | Bott .............................. 410/94 |
| 4,993,088 A | | 2/1991 | Chudik |
| 5,046,913 A | | 9/1991 | Domek et al. |
| 5,131,709 A | | 7/1992 | Spica |
| 5,513,941 A | * | 5/1996 | Kulas et al. |
| 5,549,428 A | * | 8/1996 | Yeatts ......................... 410/94 |
| 5,597,193 A | | 1/1997 | Conner |
| 5,599,055 A | | 2/1997 | Brown |
| 5,626,380 A | | 5/1997 | Elson et al. |
| 5,695,235 A | * | 12/1997 | Martindale et al. |
| 5,788,310 A | | 8/1998 | McKee |
| 5,961,262 A | * | 10/1999 | Weber ......................... 410/94 |
| 5,976,672 A | | 11/1999 | Hodgetts |
| 6,007,282 A | * | 12/1999 | Mundt ......................... 410/94 |
| 6,012,885 A | * | 1/2000 | Taylor et al. ................. 410/94 |
| D425,851 S | | 5/2000 | Tucker |
| 6,176,657 B1 | * | 1/2001 | Romph ........................ 410/94 |
| 6,241,439 B1 | | 6/2001 | Weber ......................... 410/94 |
| 6,312,034 B1 | * | 11/2001 | Coleman, II et al. ....... 296/261 |
| 6,503,036 B1 | * | 1/2003 | Bequette et al. ............. 410/94 |

* cited by examiner

*Primary Examiner*—Stephen T. Gordon
(74) *Attorney, Agent, or Firm*—The Halvorson Law Firm

(57) ABSTRACT

A device useful for loading, unloading, and securing cargo to be transported by a vehicle is described. The device comprises a bed liner and a movable platform. The moveable platform is movably inserted into a platform receiving area located in the bed liner and platform movement is limited by use of stop pins inserted into pin apertures. Suitable insert for use securing a variety of different loads are also described.

14 Claims, 9 Drawing Sheets

VEHICLE CARGO BED WITH MOVABLE PLATFORM

FIELD OF THE INVENTION

The present invention is related to the field vehicle bed liners. More specifically, the present invention is related to a novel vehicle bed liner with a movable platform useful for the loading and unloading of cargo.

BACKGROUND OF THE INVENTION

Use of conventional pickups, vans, or trucks requires a load that is being transported to be lifted and moved to a cargo bed of the vehicle. For large or heavy objects, this is often not an easy task. Further, when carrying luggage or other personal goods in such vehicles, such articles may be damaged during transit if they are free to move around in the cargo area, particularly if the truck changes speed or direction rapidly.

Various attempts have been made to facilitate easier loading by incorporating ramps, slidable tables, or other loading-assist mechanisms. While many times improving the ease by which items can be loaded to the vehicle, problems still exist with most of these types of systems. Simple ramps assist in sliding items up into a cargo bed, but must be separately stored or carried once the cargo is inside.

Other types of tailgate lifts or slidable load carrying platforms require significant hardware be installed into the vehicle bed or on or associated with the tailgate or bumper. This not only is expensive, but basically permanently alters the nature of the vehicle. In other words, for a slidable platform to be installed, a base must be securely bolted or otherwise fixed to the vehicle floor bed. The platform would then be slidably mounted on the base, typically with roller bearings.

Also, it is known that providing matting or liners for the beds of trucks and the like, tend to decrease damage due to unwanted shifting of carried articles, but such matting or liners have various disadvantages. They may not be readily adaptable to fit in different size beds, they may not effectively prevent movement of a load placed thereon, and they do not allow for easy loading and unloading of the cargo area.

Numerous devices have been made to aid loading, unloading and securing materials onto the bed of motor vehicles. Several of these devices have utilized sliding platforms that may be moved partially into and out of the bed of a truck or the back of a station wagon. A few of these slidable platforms have utilized one set of foldable legs positioned at the rear of the movable platform to allow the platform to stand on that free end while being supported on its inner end by the truck bed or station wagon floor. Patents that disclose these types of moveable platforms include U.S. Pat. Nos.: 2,788,137; 2,852,303; 3,028,025; 3,687,314; 3,768,673; and 4,993,088.

While these patents disclose a slidable platforms that may be moved partially out of the back of a vehicle, they still suffer disadvantages. If these slidable platforms are to be mounted on the vehicle by an individual, they must be picked up one end at a time, first the inner end put on the truck deck, and then the outer end picked up so as to slide the platform onto the vehicle, or else several individuals must pick of the platform.

It can therefore be seen that problems and deficiencies still exist in the art. There is a real need for an improved way to assist in loading and carrying items, especially large or heavy items in vehicles, and especially to retain flexibility and easy convertibility of use for the vehicle, as well as easy installation and removal of the system.

SUMMARY OF THE INVENTION

It is therefore a primary object of the present invention to provide a slidable carrying platform for vehicles that improves upon or solves the problems and deficiencies in the art.

Another object of the present invention is to provide a platform as below described that can be easily attached and detached from a vehicle to allow easy conversion of the vehicle between uses.

Another object of the present invention is to provide a platform as below described that can be easily installed, removed, and moved around even by one person.

A still further object of the present invention is to provide a platform as above described that is adaptable to a wide variety of vehicles, and can be installed to many vehicles using the structure of the vehicles themselves.

A further object of the present invention is to provide a platform as below described that is useful for a wide variety of uses.

A still further object of the present invention is to provide a platform as below described that facilitates easy loading, unloading, storage, and transport of items.

Another object of the present invention is to provide a platform as below described that minimizes wear and tear on the vehicle.

A still further object of the present invention is to provide a platform as below described that is sturdy, durable, economical and safe.

The novel features that are considered characteristic of the invention are set forth with particularity in the appended claims. The invention itself, however, both as to its structure and its operation together with the additional objects and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DETAILED DESCRIPTION OF THE PREFFERED EMBODIMENTS

The present invention is useful for loading, unloading, and securing cargo to be transported by a vehicle. The present invention, illustrated in FIG. 1, comprises a bed liner 100 and a movable platform 200.

Figure 2:
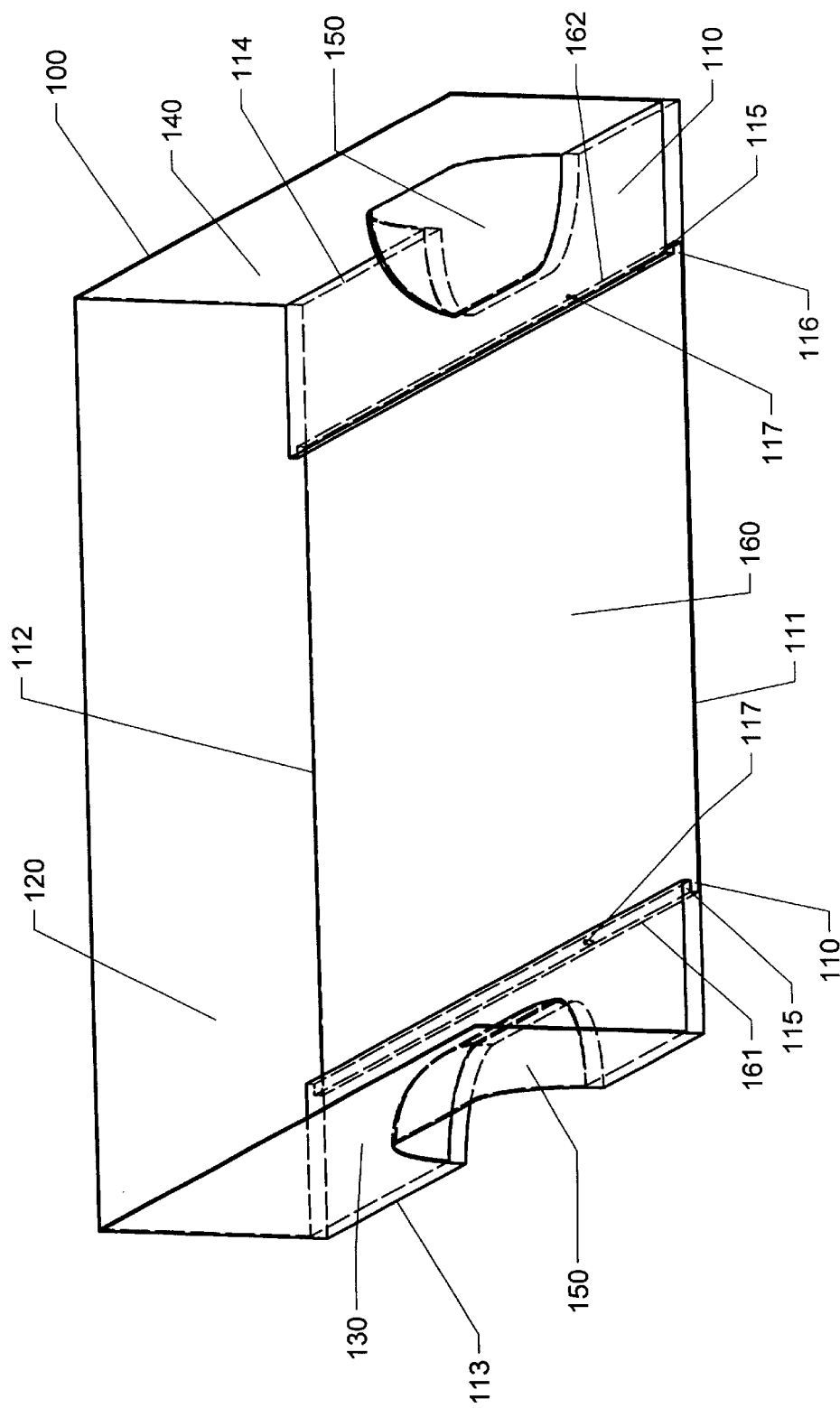
FIG. 2 is a perspective view of the bed liner of the present invention (dashed lines illustrated edges hidden from view).

The bed liner 100 has a bottom section 110, a front section 120 attached to a front edge 112 of the bottom section 110, a left section 130 attached to a left edge 113 of the bottom section 110, and a right section 140 attached to a right edge 114 of the bottom section 110, as is clearly illustrated in FIG. 2. The attachment of the various sections, 120, 130, and 140, to the bottom section 110 may be by adhesive, screws, bolts, or other mechanical connectors as is commonly known in the art, but is preferably formed as a single unit or integrally formed.

The left and right sections, 130 and 140, respectively, each have wheel well inserts 150 that can accommodate and fit around a wheel well found in a vehicle bed. The wheel well inserts 150 are located at the join between the bottom section 110 and the left and right sections, 130 and 140, with the exact location depending upon the make and model of the vehicle with which the present invention is to be used.

The bottom section includes a platform receiving area 160. The platform receiving area 160 is preferably centered in the bottom section 110 and extends from a rear edge 111 to the front edge 112. There is a lip 115 over each of left and right sides, 161 and 162, respectively, of the platform receiving area 160 that extends from the rear edge 111 to the front edge 112. Since the lip 115 projects over the platform receiving area 160, they form channels 116 that receive the movable platform 200. Each lip 115 further includes a pin aperture 117 located between the front and rear edges 112 and 111 respectively. This pin aperture 117 receives a stop pin 118 designed to limit free movement of the moveable platform 200.

Figure 3:
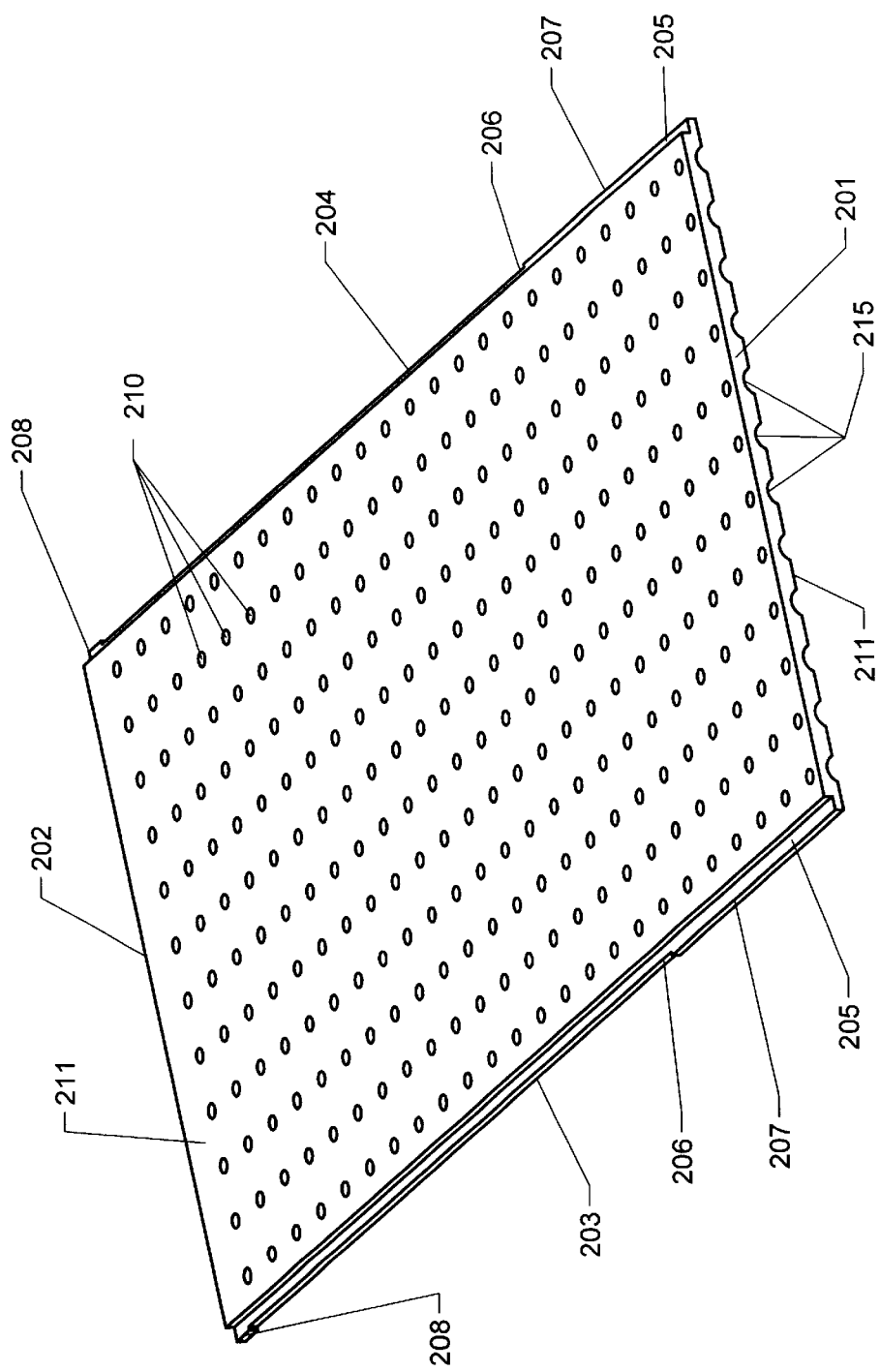
FIG. 3 is a perspective view of the movable platform of the present invention.
Figure 4:
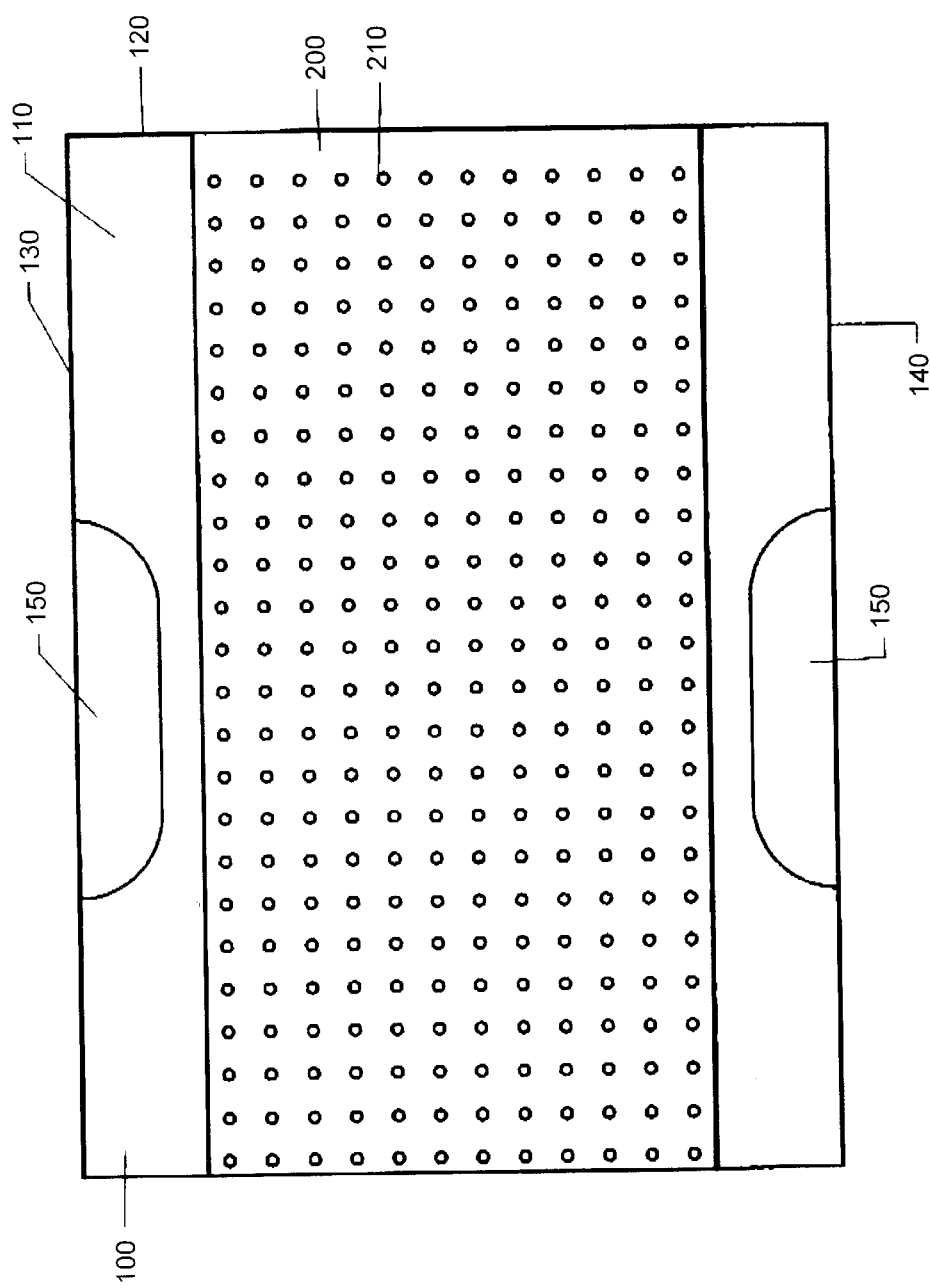
FIG. 4 is a top view of the vehicle bed liner with moveable platform according to the present invention.
Figure 5:
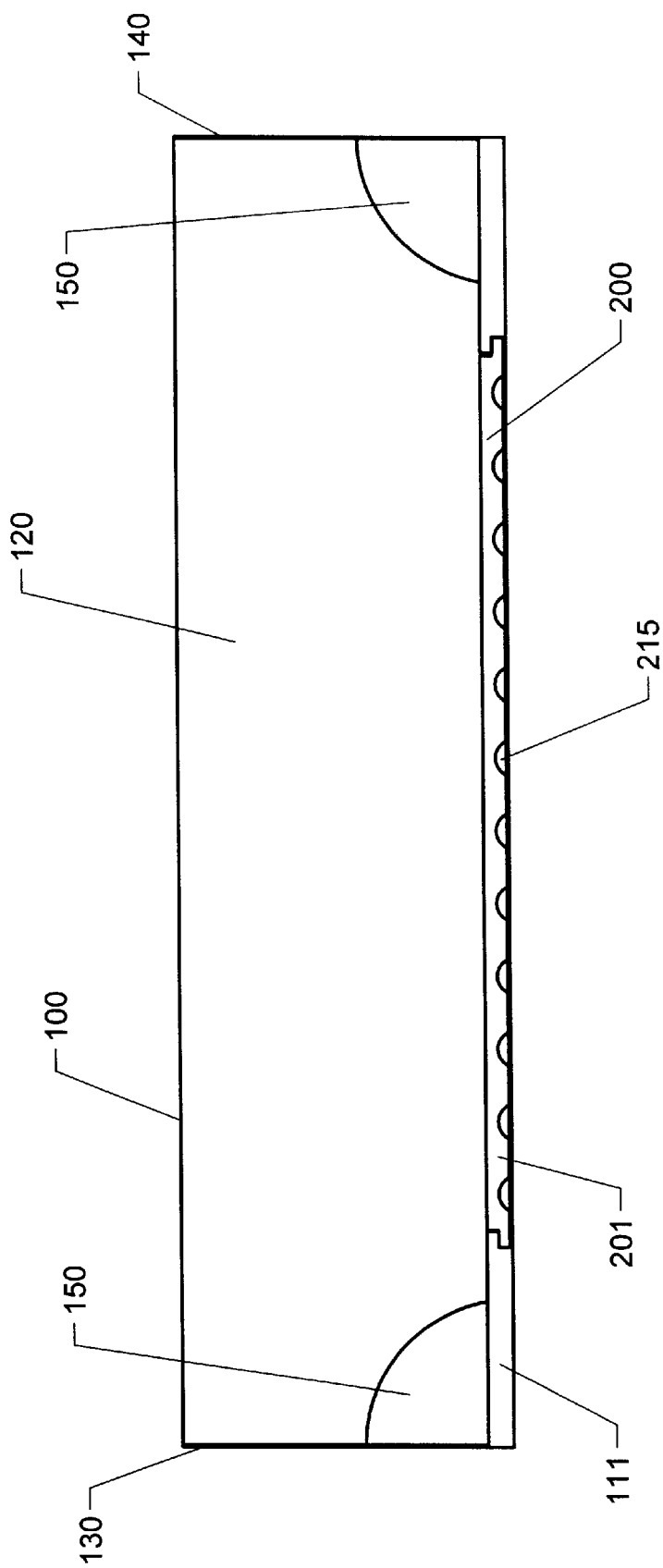
FIG. 5 is a view from the rear to the front of the vehicle bed liner with moveable platform according to the present invention.
Figure 6:
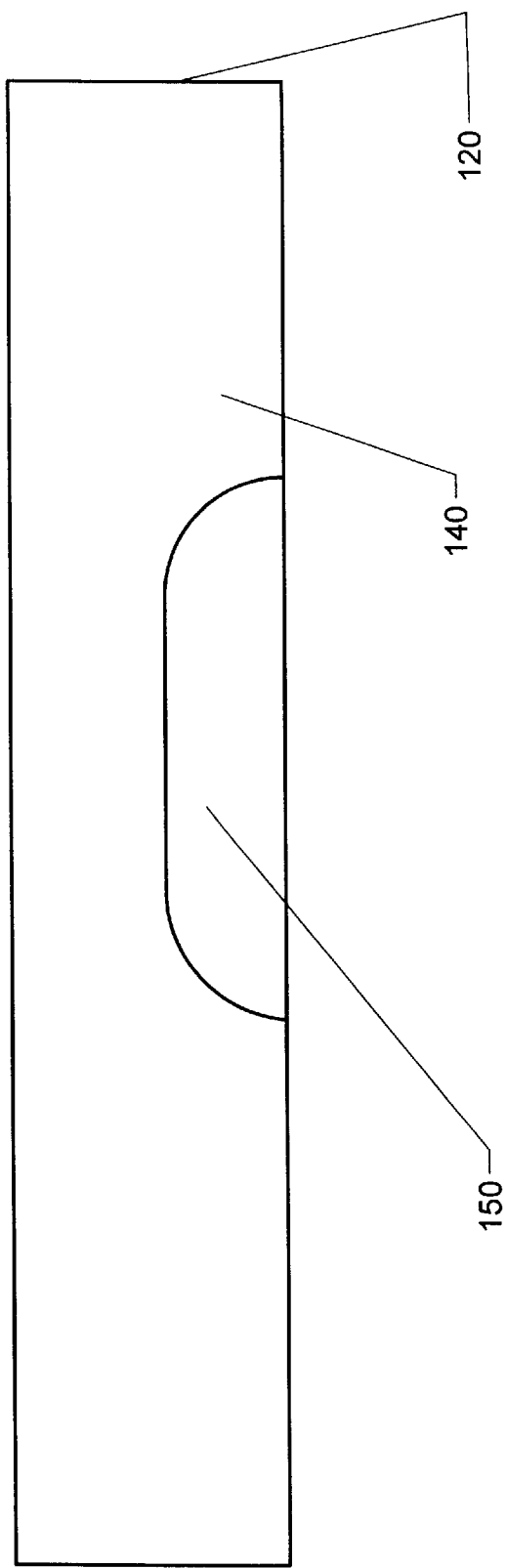
FIG. 6 is a side view of the vehicle bed liner with moveable platform according to the present invention.
Figure 7:
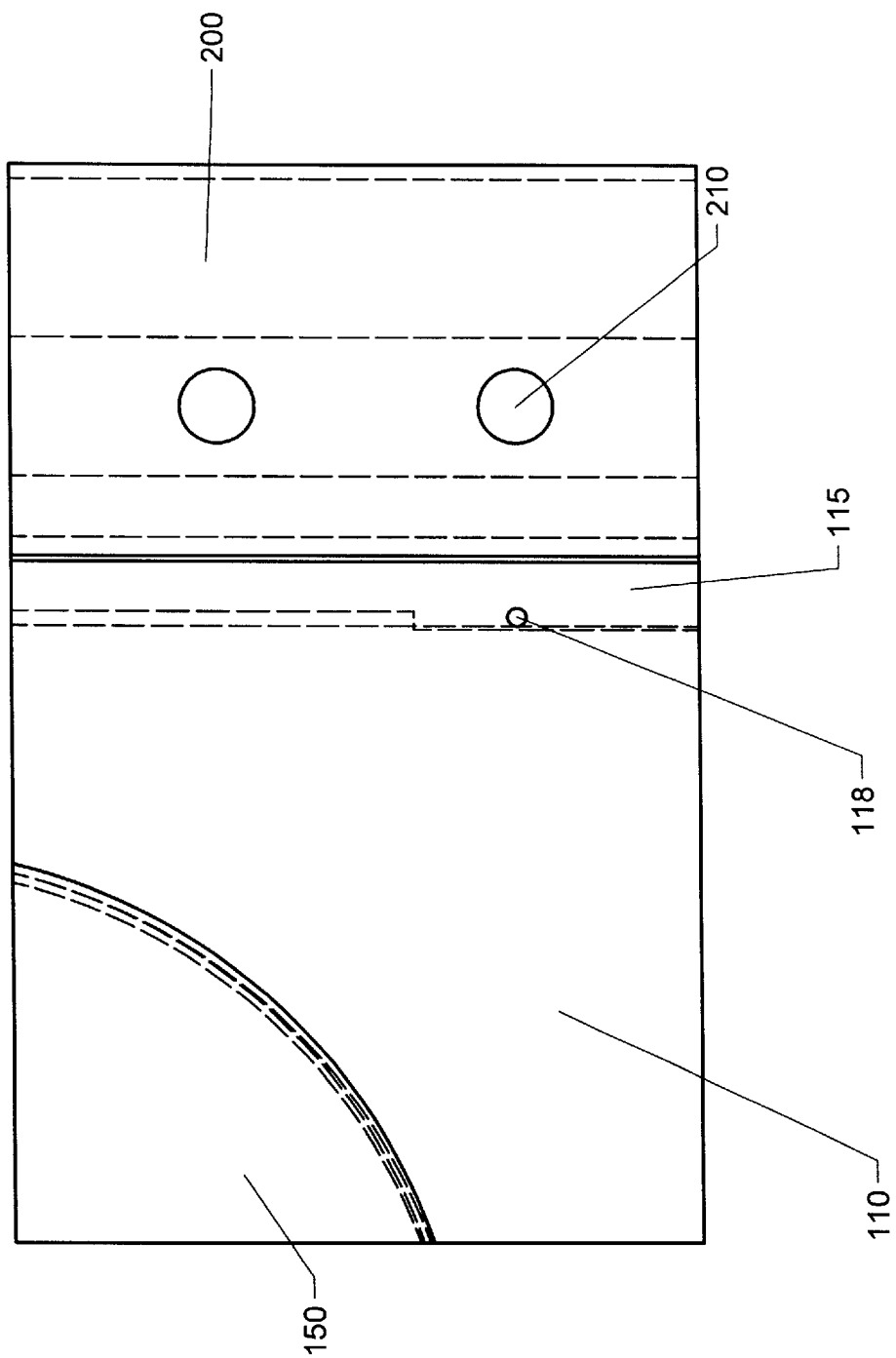
FIG. 7 is a close-up view of the vehicle bed liner with moveable platform according to the present invention clearly illustrating the stop pin in the pin aperture.

The moveable platform 200, as is clearly illustrated in FIG. 3, is a relatively thin structure having a front edge 201, a rear edge 202, a left edge 203, and a right edge 204, respectively. The left and right edges, 203 and 204, respectively, have lips 205 that are received in the channels 116 found in the platform receiving area 160. While the fit between the lip 205 of the moveable platform 200 and the channels 116 is close, it is not close enough to prevent easy sliding movement of the movable platform 200 relative to the bed liner 100.

The lips 205 of the moveable platform 200 include a pin receiving cut-out 206 having two tab ends, a front tab end 207 and a rear tab end 208. The pin receiving cut-out 206 is a space that receives the stop pin 118, yet allows movement of the moveable platform 200. When the stop pin 118 encounters either the front tab end 207 or the rear tab end 208 movement of the moveable platform is hindered or stopped. Thus, the moveable platform 200 can move between the extremes defined by the front and rear tab ends 207 and 208, respectively. While the preferred embodiment illustrated herein shows the pin receiving cut-outs 206 as notches in the lips 205, they may be elongated apertures, such as slots and still fall within the scope of the present invention.

In the preferred embodiment, the moveable platform 200 has a plurality of apertures 210 that extend between a top surface 211 and a bottom surface 212 of the moveable platform 200. These apertures 210 are designed to receive load-limiting inserts 300 useful for securing a variety of loads or cargo to the moveable platform. In the most preferred embodiment, the bottom surface 212 further includes a plurality of channels 215 that extend from the front edge 201 to the rear edge 202 of the moveable platform 200. The plurality of channels 215 are useful for collecting and removal of debris that may fall within the plurality of apertures 210.

Figure 1:
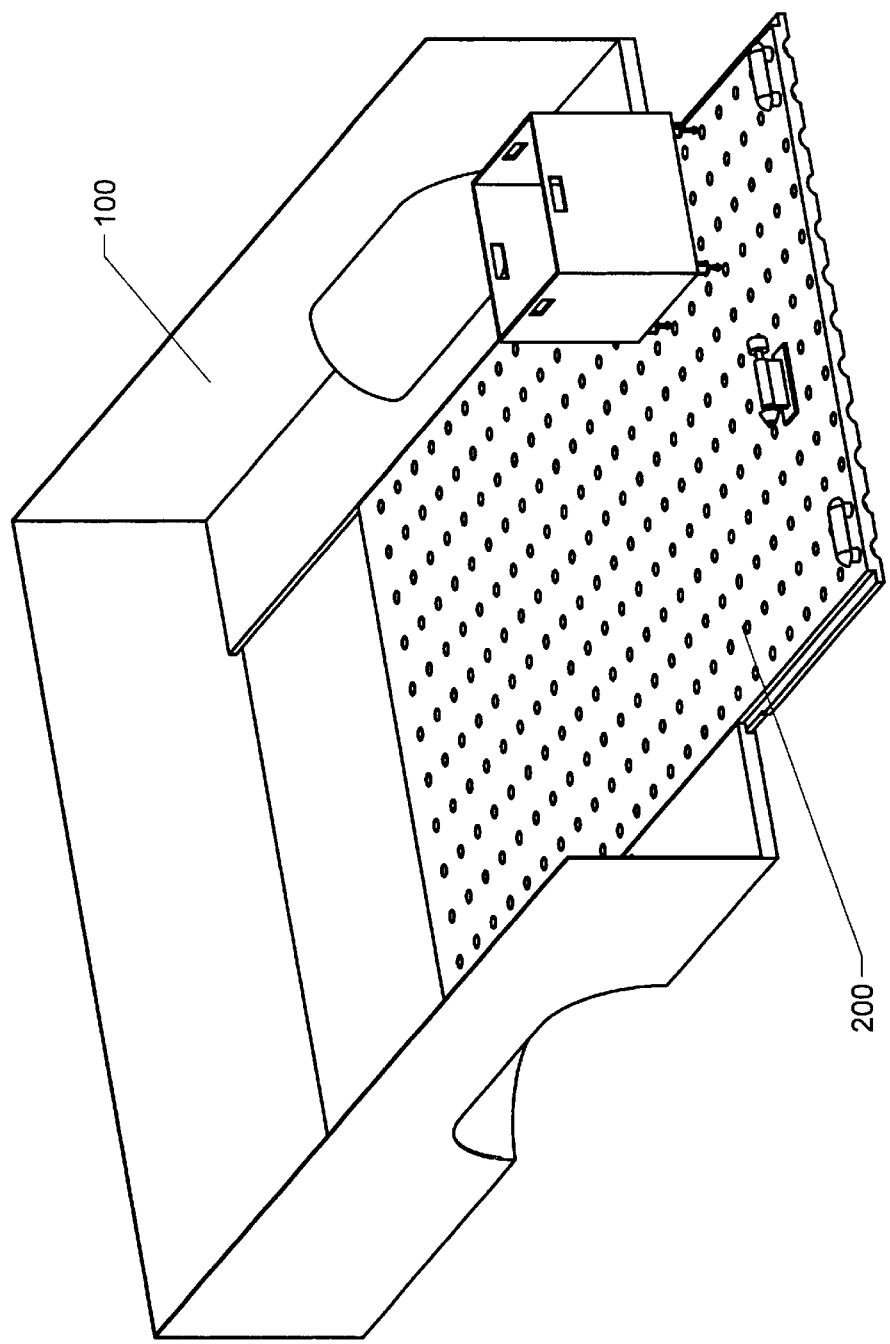
FIG. 1 is a perspective view of the vehicle bed liner with moveable platform according to the present invention.
Figure 8:
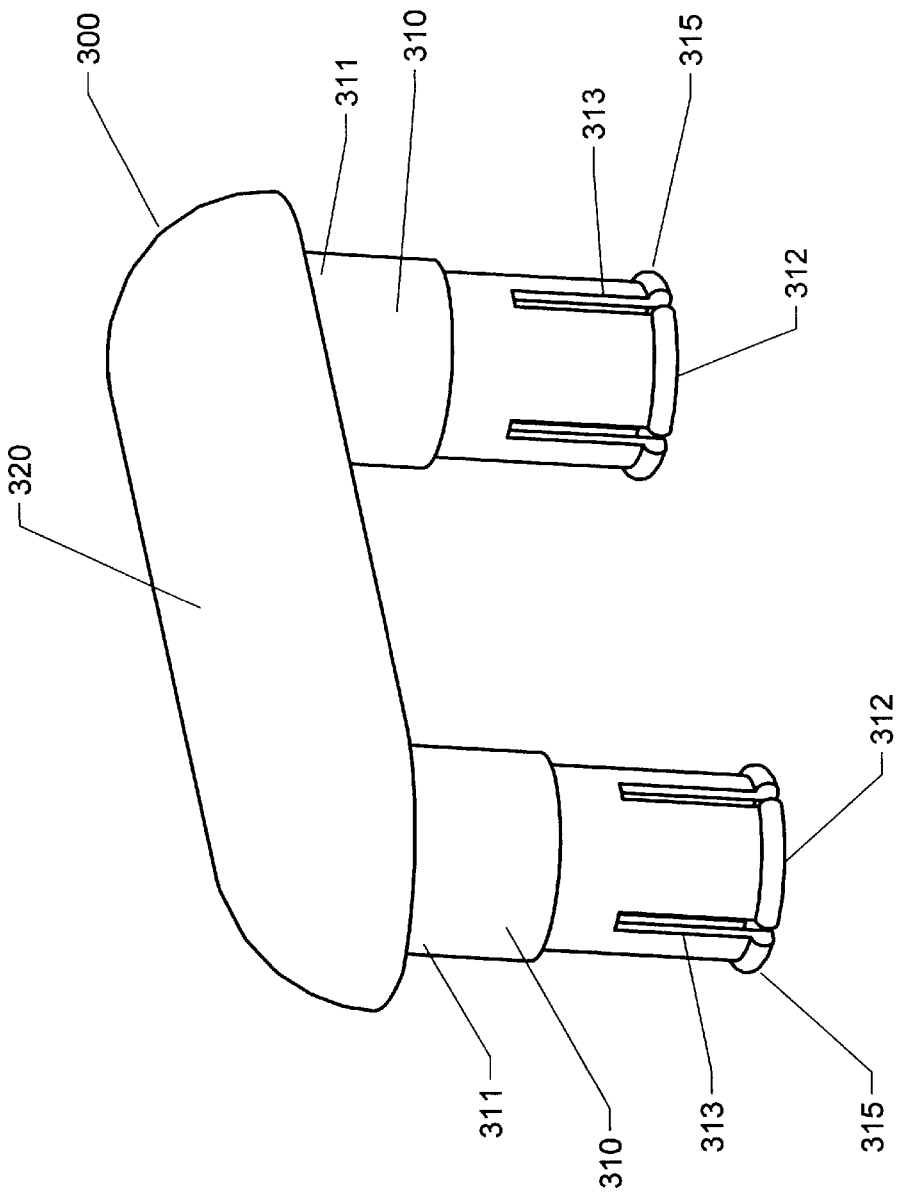
FIG. 8 is a perspective view of a load securing handle according to the present invention.
Figure 9:
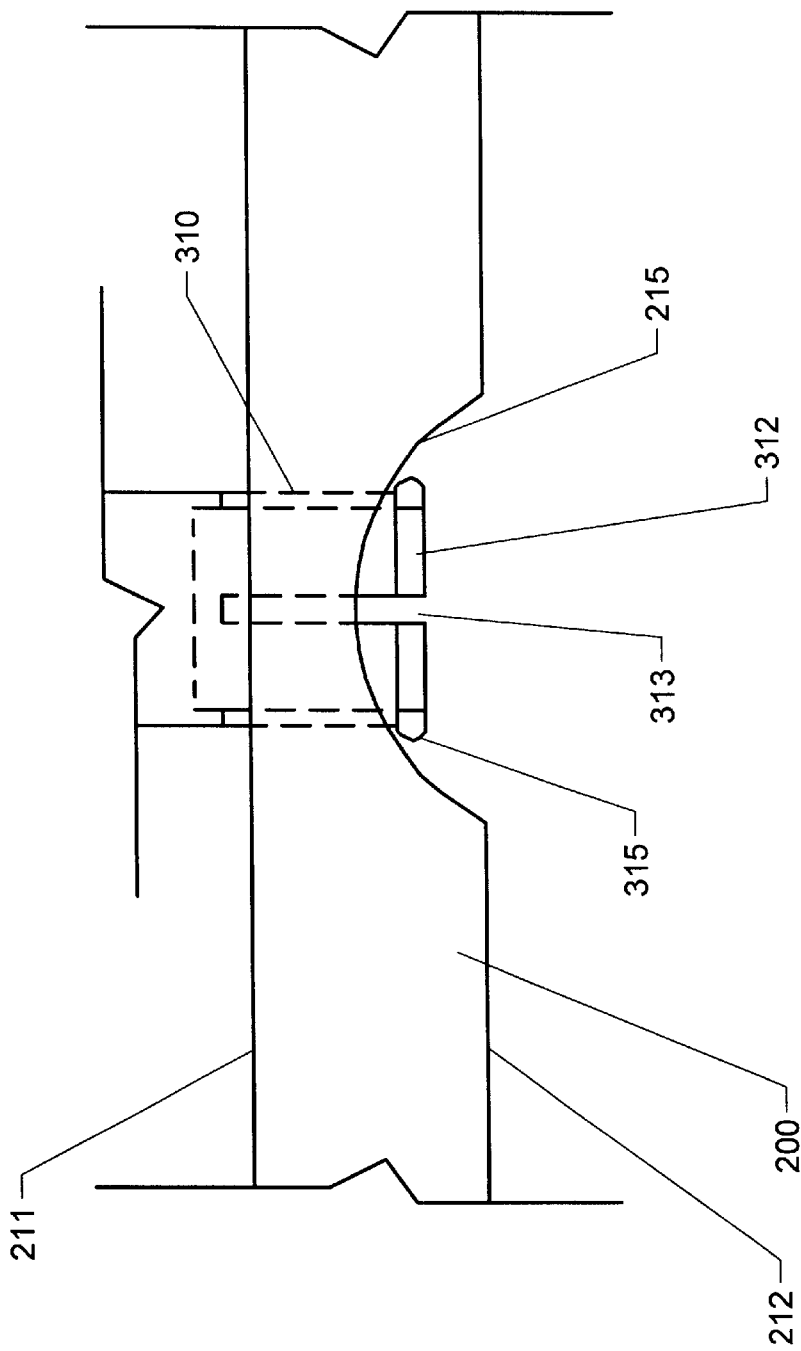
FIG. 9 is a cut-away side view of the preferred securing posts used with the apertures in the moveable platform of the present invention.

The load-limiting inserts 300, an example of which is illustrated in FIGS. 1, 8, and 9, are separated pieces designed to be used with the moveable platform 200 of the present invention. In one embodiment, illustrated specifically in FIG. 8, the insert 300 has two posts 310 that are connected by a spanning piece 320. Each post 310 is substantially cylindrical in shape and has two ends, a proximal end 311 that is adjacent the spanning piece 320 and a distal end 312 that is not adjacent the spanning piece 320. The distal end 312 is preferable split by at least two, preferably three, and even more preferably four, slits 313. These slits 313 create flanges in the distal end 312 that are slightly flexible, enough such that the posts 310 may be inserted and removed from the apertures 210 without undue effort. In order to aid in securing the posts 310 in the apertures 210, the flanges have radially extending lips 315 at their extreme distal portion. The length of the posts 310 is such that the lips 315 in the distal end 312 are received in the channels located on the bottom surface 212 of the movable platform 200 (illustrated in FIG. 9). The spanning piece 320, in a preferred embodiment, is a longitudinally split cylidrical shape with rounded ends. Other shapes may be used, for both the spanning piece 320 and posts 310, and still fall within the scope of the claims in the present application. Further, as is illustrated in FIG. 1, the posts 310 may be attached to other items, such as crates, boxes, bicycle carriers, and the like for easy cargo loading, securing and transportation.

In use, the bed liner 100 is secured, by means commonly known in the arts, to the bed of a vehicle, such as a light truck. The moveable platform 200 is inserted into the platform receiving area 160 and the stop pins 118 are inserted into the pin apertures 117 (this step may be accomplished prior to mounting the bed liner 100 into the vehicle bed). Thus, the moveable platform 200 may be moved smoothly from one extreme position (fully inserted) to another (fully extended) as is defined by the front tab end 207 and read tab end 208. When the moveable platform 200 is in the extended state, cargo may be loaded thereon and secured, either by use of the load limiting inserts 300, or by other means (as is illustrated in FIG. 1). The moveable platform 200 is then moved to the inserted state, with the cargo now ready for transportation. Unloading the cargo is just a reverse of the above.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A slidable carrying platform for vehicles comprising:
   a) a bed liner comprising a bottom section, a front section attached to a front edge of the bottom section, a left section attached to a left edge of the bottom section, and a right section attached to a right edge of the bottom section, said bed liner further comprises a platform receiving area that extends from a rear edge of the bottom section to the front edge of the bottom section and further comprises a lip extending from each of left and right edges and over each of left and right sides of the platform receiving area; and
   b) a movable platform slidably received into channels formed by the lips over the left and right sides of the platform receiving area.

2. The slidable carrying platform for vehicles according to claim 1 wherein the movable platform further comprises lips on left and right edges of the movable platform, each of said platform lips even further comprising a pin receiving cut-out having two tab ends, including a front tab end and a rear tab end.

3. The slidable carrying platform for vehicles according to claim 2 wherein each bed liner lip further comprises a pin aperture located between the front and rear read edges of the bottom section.

4. The slidable carrying platform for vehicles according to claim 3 further comprising a stop pin located within the pin apertures and within the pin receiving cut-out's of the lips of the movable platform, for limiting the sliding movement of the movable platform.

5. The slidable carrying platform for vehicles according to claim 1 wherein the movable platform further comprises a plurality of apertures that extend between a top surface and a bottom surface of the moveable platform.

6. The slidable carrying platform for vehicles according to claim 4 wherein the movable platform further comprises a plurality of apertures that extend between a top surface and a bottom surface of the moveable platform.

7. The slidable carrying platform for vehicles according to claim 5 wherein the bottom surface of the moveable platform further comprises a plurality of channels that extend from a front edge to a rear edge of the moveable platform.

8. The slidable carrying platform for vehicles according to claim 6 wherein the bottom surface of the moveable platform further comprises a plurality of channels that extend from a front edge to a rear edge of a moveable platform.

9. The slidable carrying platform for vehicles according to claim 7 in combination with at least one load limiting insert comprising two post that are connected by a spanning piece, each post sized to fit within the apertures located in the movable platform.

10. The slidable carrying platform for vehicles according to claim 8 in combination with at least one load limiting insert comprising two post that are connected by a spanning piece, each post substantially sized to fit within the apertures located in the movable platform.

11. The slidable carrying platform for vehicles according to claim 9 wherein the posts on the load limiting insert further comprise a distal end that is split by at least two slits.

12. The slidable carrying platform for vehicles according to claim 10 wherein the posts on the load limiting insert further comprise a distal end that is split by at least two slits.

13. The slidable carrying platform for vehicles according to claim 11 wherein the distal ends of the posts on the load limiting insert further comprise radially extending lips.

14. The slidable carrying platform for vehicles according to claim 12 wherein the distal ends of the posts on the load limiting insert further comprise radially extending lips.

* * * * *